United States Patent
Seki et al.

(10) Patent No.: US 7,038,658 B2
(45) Date of Patent: May 2, 2006

(54) INPUT DEVICE

(75) Inventors: Hiroaki Seki, Ishikawa (JP); Hiroshi Kakutani, Ishikawa (JP); Mitsuyoshi Maekawa, Ishikawa (JP); Sukeyasu Kanno, Ishikawa (JP)

(73) Assignees: Kanazawa University, Kanazawa (JP); Ishikawa Prefecture, Ishikawa (JP); PFU Limited, Ishikawa (JP)

( * ) Notice: Subject to any disclaimer, the term of this patent is extended or adjusted under 35 U.S.C. 154(b) by 364 days.

(21) Appl. No.: 10/385,476

(22) Filed: Mar. 12, 2003

(65) Prior Publication Data

US 2004/0012559 A1   Jan. 22, 2004

(30) Foreign Application Priority Data

Jul. 17, 2002   (JP) .............................. 2002-208077

(51) Int. Cl.
  *G09G 5/00*   (2006.01)

(52) U.S. Cl. ........................... 345/156; 341/21; 341/32

(58) Field of Classification Search ........ 345/156–169; 273/148 B; 463/37–38; 341/20–21, 32; 348/734

See application file for complete search history.

(56) References Cited

U.S. PATENT DOCUMENTS

| 5,481,265 | A | * | 1/1996 | Russell | ...................... 341/22 |
| 5,489,922 | A | * | 2/1996 | Zloof | ......................... 345/156 |
| 5,670,987 | A | * | 9/1997 | Doi et al. | ................... 345/156 |
| 6,380,923 | B1 | * | 4/2002 | Fukumoto et al. | .......... 345/156 |

FOREIGN PATENT DOCUMENTS

JP    60-082987    *    5/1985
JP    06-028096    *    2/1994

OTHER PUBLICATIONS

Shigeru Sawada et al., "Development Of Hand-Written Text Input Sensor Using Magnets For A Visually-Handicapped Person", Mar. 28, 2002, pp. 1-4.

* cited by examiner

*Primary Examiner*—Lun-Yi Lao

(57) ABSTRACT

An input device includes a magnet to be worn by a user on one fingertip of either a right hand or a left hand, a first magnetic sensor to be worn by the user on a wrist of either the right hand or the left hand to detect a magnetic field generated by the magnet at a corresponding position, a second magnetic sensor to be worn by the user on the same wrist on which the first magnetic sensor is worn and at a position that is farther from the magnet than the first magnetic sensor and eliminates effects of geomagnetism, and an output unit to output a difference between an output signal from the first magnetic sensor and an output signal from the second magnetic sensor.

18 Claims, 9 Drawing Sheets

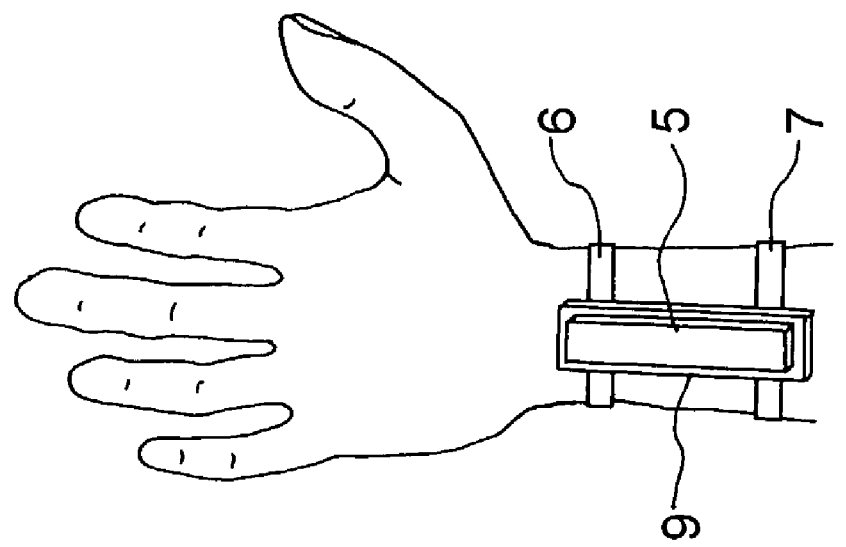
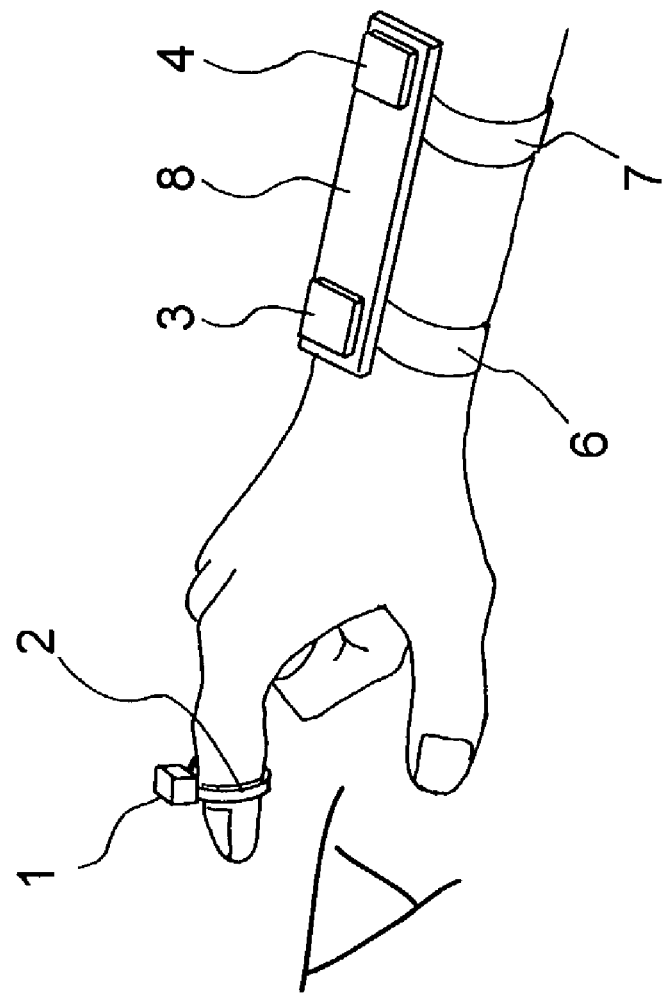
FIG. 1A
FIG. 1B

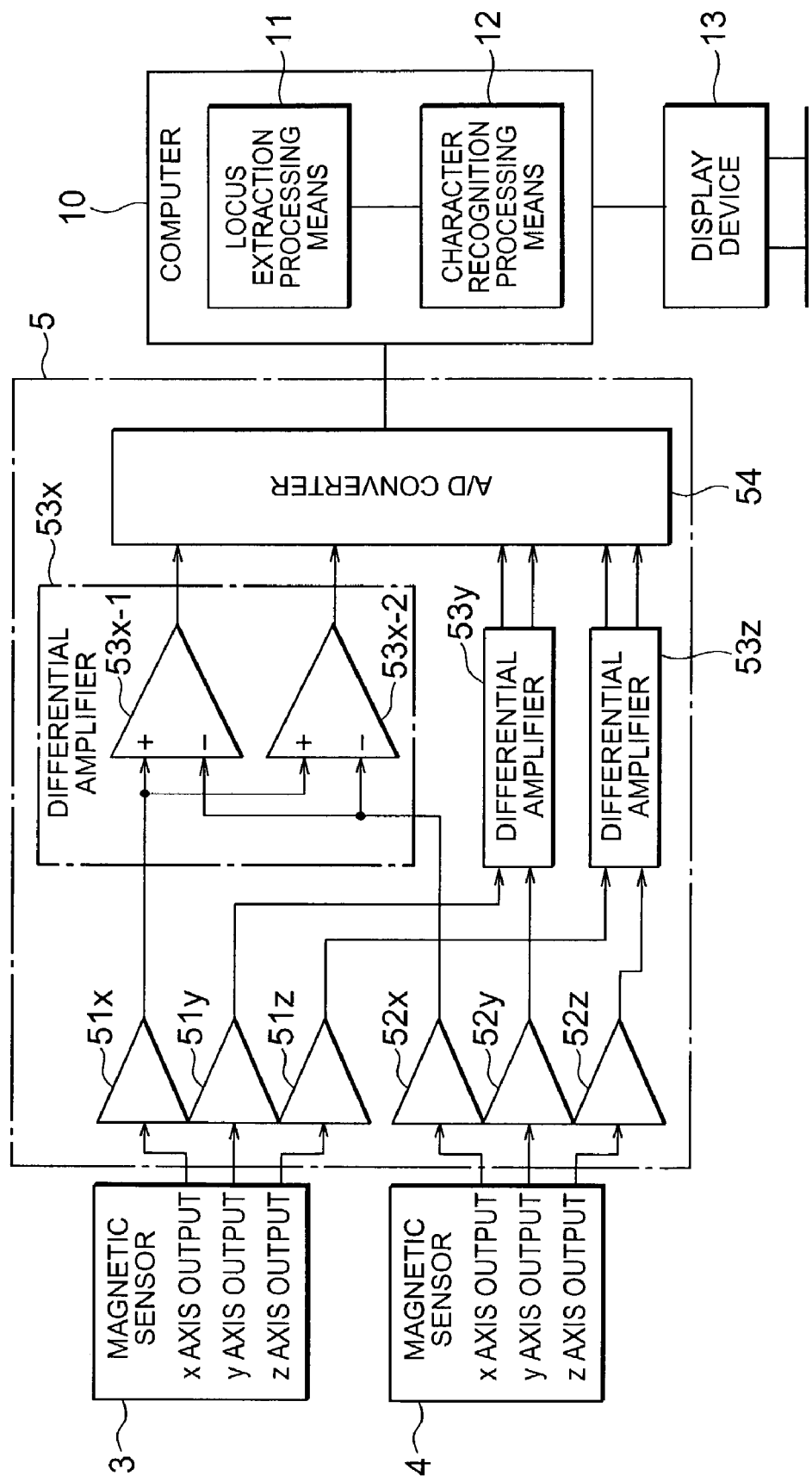

FIG. 3
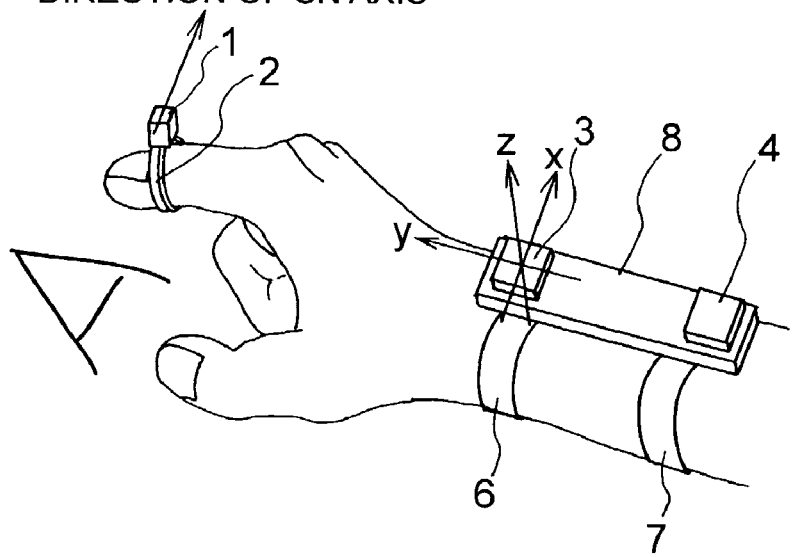
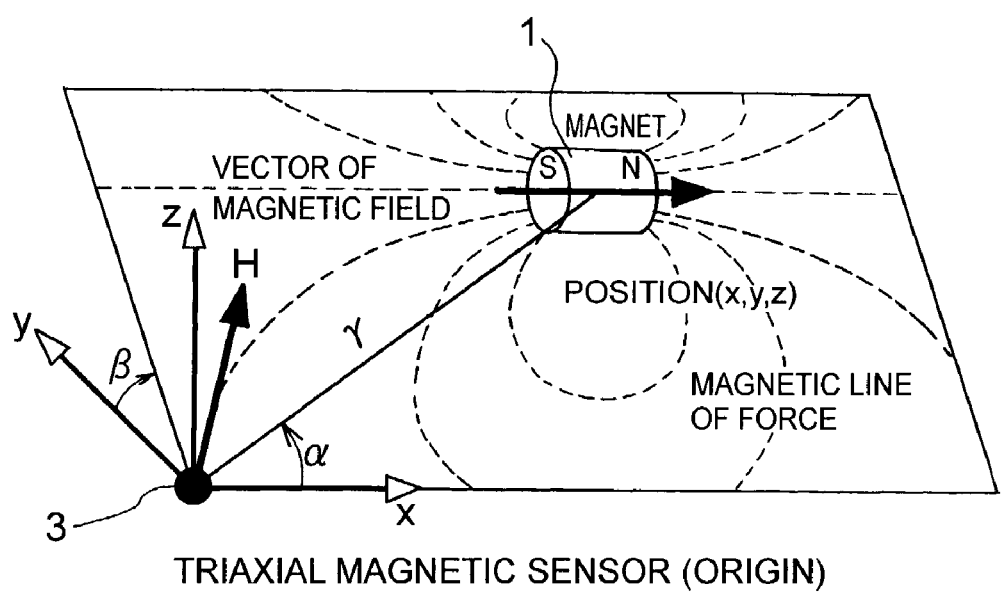
TRIAXIAL MAGNETIC SENSOR (ORIGIN)

INPUT DEVICE

BACKGROUND OF THE INVENTION

1. Field of the Invention

This invention relates to an input device, and more particularly to an input device that allows handwritten characters to be input to a computer by using a magnetic sensor worn by a user on the wrist to measure the locus of a magnet worn by the user on the fingertip as the magnet moves.

2. Description of the Related Art

Various input devices such as a braille keyboard, a mouse, a touch panel, a pen input type touch pad, and an acceleration (or accelerating force) input type pen are known to be used if a visually handicapped person inputs certain data to a computer.

The braille keyboard imposes a heavy burden on people of advanced age because it requires them to learn how the keys are arranged as well as braille. The mouse is difficult for visually handicapped people to operate because in this case, it is impossible to feed back information visually obtained. Further, a mechanical mouse may undergo serious errors owing to sliding of a ball. On the other hand, an optical mouse requires a writing surface, and may undergo serious errors if the surface is excessively reflective or for other reason. Furthermore, since the user uses the entire hand in holding the mouse, the resulting characters tend to be excessively large. On the other hand, the touch panel requires a panel as a writing surface. Such a panel is too large to carry, and the range of writing is limited to within the area of the panel. The pen input type touch pad requires both pad and pen, does not allow data to be input with one hand, and limits the range of writing to within the area of the pad. The acceleration input type pen requires handwritten characters, which are inherently positional information, to be indirectly input, thereby preventing the loci of the characters from being precisely input. Furthermore, it is difficult to determine the extent of the plane within which the mouse can be operated and the extents of the areas of the touch panel and pen input type touch pad within which data can be input.

Thus, the various input devices previously described are all difficult to operate if the user is blind, i.e. in a non-visual environment. Further, even people with normal, healthy bodies must learn how the keys are arranged and how to operate the equipment if they are of advanced age or are not skilled in operation of electronics. Accordingly, these input devices are not user friendly. Moreover, under these circumstances, substantially no input devices can be used in a mobile environment by visually handicapped people, people of advanced age, or those who are not skilled in operation of electronics (hereinafter simply referred to as "visually handicapped people and others").

On the other hand, an input device that is easily wearable and that allows handwritten characters to be directly input, if any, is very convenient to visually handicapped people. Such an input device allows a computer to be easily used even in a mobile environment. Studies conducted by the inventor indicate that a magnetic sensor is optimum for implementation of such an input device. However, in this case, detection signals are as weak as geomagnetism, so that the effects of the geomagnetism must be completely eliminated.

SUMMARY OF THE INVENTION

It is an object of the present invention to provide a wearable input device that utilizes a magnetic sensor to allow handwritten characters to be input to a computer.

An input device according to the present invention comprises a magnet to be worn by a user on one fingertip of either the right or left hand, a first magnetic sensor to be worn by the user on a wrist of either the right or left hand to detect a magnetic field generated by the magnet at a corresponding position, a second magnetic sensor to be worn by the user on the same wrist on which the first magnetic sensor is worn and at a position that is farther from the magnet than the first magnetic sensor, the second magnetic sensor eliminating the effects of geomagnetism, and output unit to output difference between output signal from the first magnetic sensor and output signal from the second magnetic sensor.

According to the input device according to the present invention, the locus of movement of the position of the magnet on the fingertip relative to the first magnetic sensor on the wrist can be detected as changes in electric signals and then input to a computer as character (or graphics; this is applied to the following description) information. Further, in this case, the second magnetic sensor can be used to eliminate the effects of the geomagnetism on the first magnetic sensor, thereby substantially precisely detecting the locus of the magnetic on the fingertip. Compared to the various conventional input devices, this allows even visually handicapped people, people of advanced age, or those who are not skilled in operation of electronics (visually handicapped people and others) to easily input characters without learning how the keys are arranged or how to operate the device or paying attention to limits on an input position because there are no such limits. Further, this device can be worn on the fingertip and the wrist. Accordingly, the user can easily wear this device and carry it anywhere (wearable). Even visually handicapped people and others can use the input device of the present invention in a mobile environment and can thus operate a computer anywhere.

An input device according to the present invention comprises a magnet to be worn by a user on one fingertip of either the right or left hand, a magnetic sensor connected to the magnet and to be worn by the user on a wrist of either the right or left hand to detect a magnetic field generated by the magnet at a corresponding position, and output unit to supply an alternating current signal to the magnet and magnetic sensor and to detect output signal from the magnetic sensor on the basis of synchronous detection.

According to the input device of the present invention, the locus of movement of the magnet on the fingertip can be detected and then input to a computer, as previously described. Further, in this case, synchronous detection can be utilized to eliminate the effects of the geomagnetism on the magnetic sensor. Thus, the locus of the magnet on the fingertip can be substantially precisely detected. This allows even visually handicapped people and others to, for example, easily input character information and to easily wear this device and carry it anywhere, as previously described. Therefore, even visually handicapped people and others can use the input device of the present invention in a mobile environment and can thus operate a computer anywhere.

BRIEF DESCRIPTION OF THE DRAWINGS

FIGS. 1A and 1B are a view showing a configuration of an input device.

FIG. 2 is a diagram showing a configuration of the input device.

FIG. 3 is a view illustrating the input device shown in FIGS. 1A, 1B and 2.

DETAILED DESCRIPTION OF THE PREFERRED EMBODIMENTS

Figure 4:
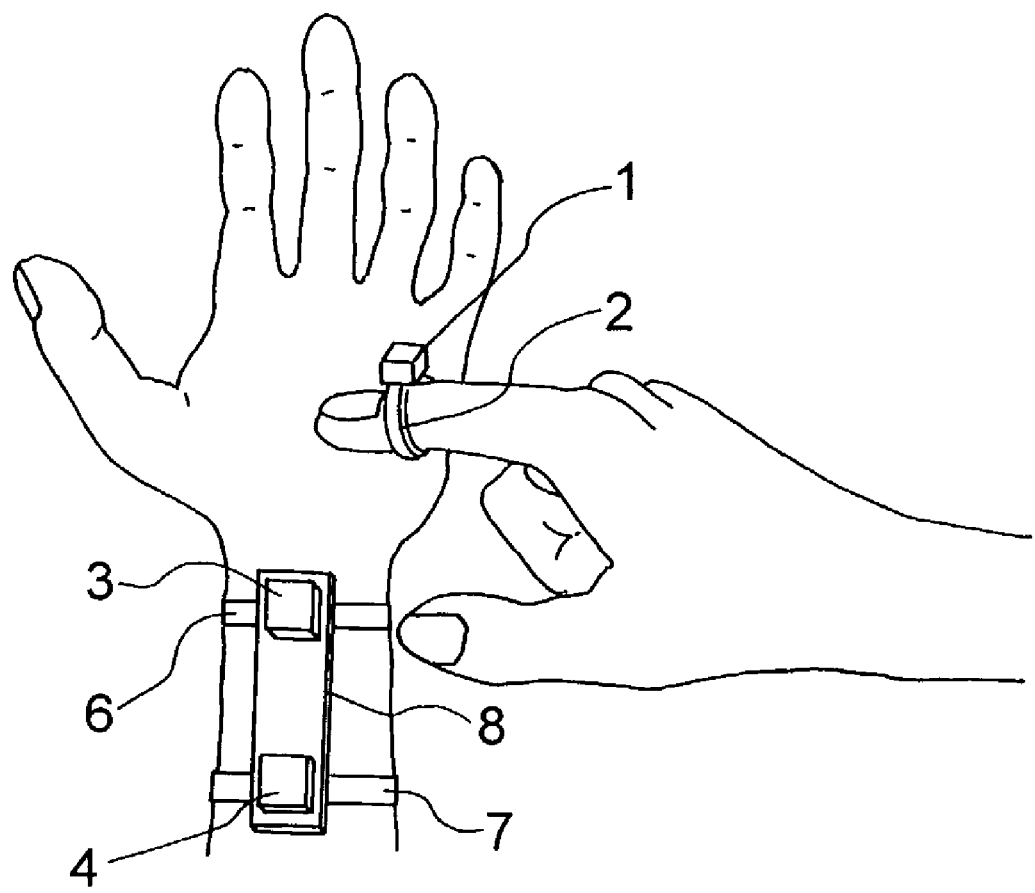
FIG. 4 is a view showing a configuration of another input device.

FIGS. 1A, 1B and 2 show a configuration of an input device according to the present invention which is worn by a user on one hand to detect a three-dimensional position. In particular, FIGS. 1A and 1B show how the input device is worn by the user, and FIG. 2 shows a configuration of the input device of the present invention.

The input device of the present invention has a magnet 1, a first magnetic sensor 3, a second magnetic sensor 4, output unit 5, a locus extraction processing means 11, and a character recognition processing means 12 as shown in FIGS. 1A, 1B and 2. The magnet 1, the first magnetic sensor 3, the second magnetic sensor 4, and the output unit 5 are always carried by, for example, the user and are worn by the user (who inputs data) under predetermined conditions when data are to be input. That is, the magnet 1 is worn, for example, on the fingertip of the forefinger of the right hand, with the other components worn, for example, on the wrist of the right hand. The output unit 5 is connected to a computer 10 in which the locus extraction processing means 11 and the character recognition processing means 12 are provided. The computer 10 has a display device 13 (or a print device, an auxiliary storage device, or the like) as an example of output means.

The user moves the fingertip with the magnet 1 worn thereon relative to the wrist with the first magnetic sensor 3 worn thereon (i.e. while the wrist remains fixed) to draw characters in a three-dimensional (or two-dimensional) space. A magnetic field (or changes in magnetic field caused by movement of the magnet 1) generated by the magnet 1 at a corresponding position is detected by the first magnetic sensor 3. At this time, the second magnetic sensor 4 eliminates the effects of geomagnetism. That is, the output unit 5 detects a difference between an output signal from the first magnetic sensor 3 and an output signal from the second magnetic sensor 4. This results in a signal based on the magnetic field generated by the magnet 1 at the corresponding position and from which the effects of the geomagnetism has been eliminated. This indicates changes in the position of the magnet 1 relative to the first magnetic sensor 3. Thus, the locus extraction processing means 11 uses this signal to execute a predetermined calculation process to extract the locus of the magnet 1. On the basis of this track, the character recognition processing means 12 executes, for example, a character (or graphics) recognition process.

Then, with reference to FIG. 3, description will be given of the principle of detection of a magnetic field generated by the magnet 1 at the corresponding position which detection is carried out by the input device in FIGS. 1A, 1B and 2. FIG. 3 is a view illustrating the input device and indicating a principle of detection of a three-dimensional position executed by the input device in FIGS. 1A, 1B and 2.

Examinations carried out by the inventor indicate that handwritten characters drawn by the fingertip can be input by detecting the position (x, y, z) of (the magnet 1 on) the fingertip relative to the wrist in real time. To accomplish this, the input device of the present invention is constructed as shown in FIGS. 1A and 1B (and FIG. 2) so that the first magnetic sensor 3 worn by the user on the wrist can detect (changes in) a magnetic field generated by the magnet 1 worn by the user on the fingertip. That is, on the basis of the fact that the vector H (orientation and magnitude) of the magnetic field depends on the position of the magnet 1, the position (x, y, z) of the magnet 1, which is generating the magnetic field, is determined (calculated) from the detected (measured) vector H of the magnetic field.

In order to detect a three-dimensional position (x, y, z) as shown in FIGS. 1A and 1B, the first magnetic sensor 3 must be of a triaxial type that detects positions in an x, y, and z directions. In order to detect a two-dimensional position (x, y) as shown in FIG. 4, described later, the first magnetic sensor 3 must be of a biaxial type that detects positions in an x and y directions. However, in either case, in order to determine the position of the magnet 1, its posture must remain unchanged. Alternatively, the posture of the magnet 1 must be expressed by a simple function depending on the position of the magnet 1.

Actually, if the device is worn by the user as shown in FIGS. 1A and 1B, the posture of the magnet 1 (the orientation of an S and N poles) remains substantially unchanged relative to the first magnetic sensor 3. That is, the orientation of the S and N poles of the magnet 1 is aligned with a plane created by a ring 2. Further, the first magnetic sensor 3 is mounted on a support 8 so that its x axis is orthogonal to the longitudinal direction of the support 8, which is worn by the user so as to extend in the same direction as that of the wrist. This allows the magnet 1 to be worn so that the orientation of the S and N poles of the magnet 1 is substantially orthogonal to the orientation of the fingertip, while allowing the first magnetic sensor 3 to be worn so that its x axis is substantially orthogonal to an extension of orientation of the fingertip (the extension assumed if the forefinger is straightened in a normal manner) (that is, the x axis is substantially parallel with the S and N poles of the magnet 1). Wearing the device in this manner substantially prevents the vector H of the magnetic field from being adversely affected even if the fingertip (and the wrist) is moved unless the wrist is extremely twisted and regardless of slight changes in the orientation of the S and N poles of the magnet 1 relative to the first magnetic sensor 3.

In FIG. 3, if the magnet 1 with a magnetic moment m is located at the position (x, y, z), the relationship between this position and the vector H=(Hx, Hy, Hz) of the magnetic field measured by the first magnetic sensor 3, located at an origin, is determined. If magnetic permeability is defined as $\mu$, a component Hr of the magnetic field travelling from the magnet 1 to the first magnetic sensor 3 and a component Ht travelling perpendicularly to the component Hr in a plane containing the axis of the magnet 1 (the orientation of the S and N poles) and the x axis of the first magnetic sensor 3 are expressed by:

$$Hr = (-2K \cos \alpha)/r^3, \text{ and}$$

$$Ht = (K \sin \alpha)/r^3$$

where $r = (x^2 + y^2 + z^2)^{1/2}$, $\alpha = \tan^{-1}((y^2 + z^2)^{1/2}/x)$, and $K = m/4\pi\mu$ and where r denotes the distance between the magnet 1 and the first magnetic sensor 3, α denotes the direction of the magnet 1 relative to the x axis of the first magnetic sensor 3, r and α are both expressed by positional coordinates, and K is a constant.

If the components Hr and Ht of the magnetic field are synthesized together and the synthesized component is then redistributed to the x, y, and z axes, the vector of the magnetic field at the origin (the position of the first magnetic sensor 3) is expressed by:

$$Hx = -Hr \cos \alpha - Ht \sin \alpha = K/r^3 (3 \cos^2 \alpha - 1),$$

$$Hyz = -Hr \sin \alpha + Ht \cos \alpha = K/r^3 (3 \cos \alpha \sin \alpha),$$

$$Hy = Hyz \cos \beta, \text{ and}$$

$$Hz = Hyz \sin \beta$$

where $\beta = \tan^{-1}(z/y)$ and β denotes the angle of the first magnetic sensor 3 relative to the y axis in a plane containing the axis of the magnet 1 and the x axis of the first magnetic sensor 3 and β is expressed by positional coordinates, and r, β, and α denote polar coordinates.

If the position of the magnet 1 is determined (assumed) from the vector H=(Hx, Hy, Hz) of the magnetic field measured by the first magnetic sensor 3, the above equations may be solved reversely. On the basis of Hy and Hz, the following equations are given:

$$\beta = \tan^{-1}(Hz/Hy), \text{ and}$$

$$Hyz = (Hy^2 + Hz^2)^{1/2}.$$

Further, on the basis of Hx and Hyz, the following equations are given:

$$\alpha = \cos^{-1}(A)^{1/2},$$

$$r = ((K^2(3A+1))/(Hx^2 + Hyz^2))^{1/6}, \text{ and}$$

$$A = ((3Hx^2 + 2Hyz^2) + Hx(9Hx^2 + 8Hyz^2)^{1/2})/6(Hx^2 + Hyz^2).$$

On the basis of the thus determined polar coordinates (r, β, α), the position of the magnet 1 can be calculated as follows:

$$x = r \cos \alpha,$$

$$y = r \sin \alpha \cos \beta, \text{ and}$$

$$z = r \sin \alpha \sin \beta.$$

That is, the positional coordinates (x, y, z) of the magnet 1 can be expressed by the vector H=(Hx, Hy, Hz) of the magnetic field measured by the first magnetic sensor 3.

The magnetic field generated by the magnet 1 on the fingertip is at the level of the geomagnetism (about 0.5 gauss). Thus, the first magnetic sensor 3 detects both the magnetic field generated by the magnet 1 and the geomagnetism. Thus, in addition to the first magnetic sensor 3, the second magnetic sensor 4 is worn by the user so as to be located at a predetermined distance from the first magnetic sensor 3. The second magnetic sensor 4 has the same configuration or structure as that of the first magnetic sensor 3 and is worn substantially on an extension of orientation of the fingertip in substantially the same manner as that for the first magnetic sensor 3. Because of its fixed direction and magnitude, the geomagnetism produces the same effects on the first and second magnetic sensors 3 and 4. On the other hand, since the effects of the magnet 1 are in inverse proportion to the third power of the distance, they are higher on the first magnetic sensor 3, located closer to the magnet 1, than the second magnetic sensor 4 which located farther from the magnet 1. Accordingly, the effects of the geomagnetism can be substantially compensated for by determining a difference between an output from the first magnetic sensor 3 and an output from the second magnetic sensor 4. That is, in this example, the positional coordinates (x, y, z) of the magnet 1 are expressed by the difference ΔH=(ΔHx, ΔHy, ΔHz) between the output from the first magnetic sensor 3 and the output from the second magnetic sensor 4.

Thus, the intensity of the magnetic field decreases in inverse proportion to the third power of the distance, so that the level of an output signal from the first magnetic sensor 3 is very low and varies rapidly. Thus, preferably, the detection range is widened by using a plurality of amplifiers having different amplification factors to amplify signals from the first magnetic sensor 3 (and the second magnetic sensor 4), and switching these amplifiers.

As shown in FIG. 1A, the magnet 1 is fixed to the ring 2, which allows the magnet 1 to be worn on the fingertip of either the right or left hand like a real ring. The ring 2 is normally worn near the first joint of the forefinger of the user's dominant hand (in FIGS. 1A and 1B, the right hand) so that the magnet 1 is located on the back of the hand. In this example, the magnet 1 has only to be made of a material that can be detected by the first magnetic sensor 3, e.g. a permanent magnet having a thickness of 4 mm, a length of 5 mm, and a width of 5 mm. On the other hand, the ring 2 is preferably made of a material that is not detected by the first magnetic sensor 3 of the magnet 1, e.g. plastics, so as to allow the first magnetic sensor 3 to smoothly carry out the detection or allow the position of the magnet 1 to be precisely detected.

The user inputs, for example, the character "A" by moving the fingertip with the magnet 1 worn thereon so as to draw the locus of this character "A" in the air as shown in FIG. 1A. Input characters are not limited to alphabets but may be kana characters of Japanese, katakana characters of Japanese, kanji character, numericals, symbols, or the like.

Accordingly, the user can input characters by simply moving the fingertip in the air. Thus, for example, bed-ridden people can freely input characters. Further, since characters can be input with one hand, the other hand can be freely used. This is very convenient. On the other hand, the device requires no writing surfaces or frames and can be easily worn by the user. Therefore, this input device is wearable and can be used in a mobile environment at any time. Further, the magnet 1 and the ring 2, worn on the fingertip, are small and light, thereby preventing the user from feeling that he or she is compressed at the finger. Furthermore, the magnet 1 and the ring 2 do not cover the thick of the finger, so that the user does not lose his or her sense of touch. Accordingly, other input devices such as a keyboard can be used simultaneously. Further, visually handicapped people can input characters by tracing braille with their hand. Moreover, characters can be precisely input while preventing signals from being blocked by an obstacle, if any.

The first magnetic sensor 3 and the second magnetic sensor 4 are fixed to the support body 8, fixed to two wrist bands 6 and 7, as shown in FIG. 1A. In this example, the support body 8 is worn on the wrist of the right hand by the wrist bands 6 and 7 so as to lie on an extension of the back of the right hand. This sets the distance r between the magnet 1 and the first magnetic sensor 3 at, for example, several to twenty cm. Accordingly, only very small magnetic fields can be detected. In contrast, as the distance s between the first magnetic sensor 3 and the second magnetic sensor 4 increases compared to the distance r, the second magnetic sensor 4 is more unlikely to be affected by the magnet 1. Thus, the position of the magnet 1 can be more accurately measured. In the specification, the "wrist" in the expression "worn on the wrist" actually refers to the part of the arm between the wrist and the elbow (i.e. the forearm) as shown in FIGS. 1A and 1B. Further, the wrist bands 6 and 7 are preferably composed of a material that is not detected by the first magnetic sensor 3, e.g. leather or plastics, for a reason similar to the one previously described. Similarly, the support body 8 is composed of, for example, plastics.

The output unit 5 is fixed to a support body 9 fixed to the two wrist bands 6 and 7 as shown in FIG. 1B. In this example, the support body 9 is worn on the wrist of the right hand by the wrist bands 6 and 7 so as to lie on the extension of the palm of the right hand. Further, the support body 9 is composed of, for example, plastics, for a reason similar to the one previously described. The output unit 5 is sufficiently small and does not inconvenience the user when worn on the wrist.

A shielding wire connecting the output unit 5 and the computer 10 together is not shown. The output unit 5 and the computer 10 need not be connected together using a shielding wire but may be wirelessly connected together. Further, the output unit 5 and the support body 9 need not necessarily be worn on the wrist but may be worn on the upper arm of the user, placed in a breast pocket, or attached to a belt around the waist.

The first magnetic sensor 3 is worn on either the right or left hand. In this example, it is worn on the same hand (right hand) on which the magnet 1 is worn. The first magnetic sensor 3 detects a magnetic field by the magnet 1 at the corresponding position. That is, it is used for detection. Thus, the first magnetic sensor 3 is composed of a multiaxial Hall element. In this example, the locus of movement of the magnet 1 must be perceived as a three-dimensional space because a two-dimensional plane is twisted as described later. Accordingly the first magnetic sensor 3 is composed of a Hall element with three axes (x, y, z).

The second magnetic sensor 4 is worn on the same wrist on which the first magnetic sensor 3 is worn and at a position that is farther from the magnet 1 than the position of the first magnetic sensor 3. In this example, it is worn on the right hand. The second magnetic sensor 4 eliminates the effects of the geomagnetism. That is, it is used for cancellation. Thus, the second magnetic sensor 4 is constructed similarly to the first magnetic sensor 3, and is composed of a multiaxial Hall element. In this example, it is composed of a triaxial Hall element.

The first magnetic sensor 3 has only to be small enough to be worn on the fingertip. It may be a multiaxial magnetoresistive (MR) element, a multiaxial magnetic impedance (MI) element, or the like. This also applies to the second magnetic sensor 4. However, the first and second magnetic sensors 3 and 4 are preferably of the same type. This also applies to the other examples.

The output unit 5 outputs a difference between an output signal from the first magnetic sensor 3 and an output signal from the second magnetic sensor 4. To accomplish this, the output unit 5 comprises first-stage amplifiers 51 (51$x$, 51$y$, and 51$z$) corresponding to the first magnetic sensor 3, first-stage amplifiers 52 (52$x$, 52$y$, and 52$z$) corresponding to the second magnetic sensor 4, differential amplifiers 53 (53$x$, 53$y$, 53$z$), and a multichannel analog/digital converter (A/D converter) 54 as shown in FIG. 2. Further, although not shown, the output unit 5 has its own power supply (e.g. a small-sized battery).

The first-stage amplifiers 51$x$, 51$y$, and 51$z$ correspond to signal outputs Hx, Hy, and Hz for the axes x, y, and z from the first magnetic sensor 3, composed of a triaxial Hall element. The first-stage amplifiers 51$x$, 51$y$, and 51$z$ then amplify input signal outputs for the axes x, y, and z and output the amplified signals. For example, if the first magnetic sensor 3 detects a 1-gauss magnetic field, it outputs an electric signal of about 5 mV (millivolt). The first-stage amplifier 51$x$ amplifies this detection signal about 230 times. This also applies to the other first-stage amplifiers 51$y$ to 52$z$. The first-stage amplifiers 52$x$, 52$y$, and 52$z$ correspond to signal outputs Hx', Hy', and Hz' for the axes x, y, and z from the second magnetic sensor 4, composed of a triaxial Hall element. The first-stage amplifiers 52$x$, 52$y$, and 52$z$ then amplify input signal outputs for the axes x, y, and z and output the amplified signals.

The differential amplifier 53$x$ detects the difference (ΔHx) between the output (Hx) from the first-stage amplifier 51$x$ and the output (Hx') from the first-stage amplifier 52$x$. The differential amplifier 53$x$ then amplifies the difference and outputs the amplified signal. The differential amplifier 53$x$ is composed of a differential amplifier 53$x$-1 with a larger amplification factor and a differential amplifier 53$x$-2 with a smaller amplification factor. Although not shown, this also applies to the differential amplifiers 53$y$ and 53$z$. The differential amplifier 53$x$-1 has an amplification factor of, for example, about 20 and thus amplifies a 1-gauss signal to about 28 V. The differential amplifier 53$x$-2 has an amplification factor of, for example, about 2 and thus amplifies a 1-gauss signal to about 2.8 V.

As previously described, the intensity of a magnetic field decreases in inverse proportion to the third power of a distance. Accordingly, if signals from the first magnetic sensor 3 (and the second magnetic sensor 4) are amplified with a fixed amplification factor, the range of positions that can be detected is limited. Thus, in this example, the range of the positions of the magnet 1 that can be detected is widened by switching the plurality of (in this example, two) amplifiers with the different amplification factors. That is, while the first magnetic sensor 3 (and the second magnetic sensor 4) is outputting small signals, the differential amplifier 53$x$-1, which has the larger amplification factor, is used. Once this output is saturated, the differential factor 53$x$-1 is switched to the differential amplifier 53$x$-2, which has the smaller amplification factor. This enables a wide range of signals, i.e. positions to be detected.

The number of differential amplifiers 53$x$ (stages) is not limited to two but may be three or more. These amplifiers may be sequentially switched in the order of decreasing amplification factor.

The A/D converter 54 sequentially converts (analog) signals input by the differential amplifiers 53$x$, 53$y$, and 53$z$ into digital signals, and inputs these signals to the computer 10. That is, the digital signals corresponding to the differences ΔHx, ΔHy, and ΔHz between the detection outputs Hx, Hy, and Hz from the first magnetic sensor 3 and the detection outputs Hx', Hy', and Hz' from the second magnetic sensor 4, respectively, are formed and input to the computer 10. The A/D converter 54 has six channels to process two inputs from each of the differential amplifiers 53x, 53y, and 53z. The A/D converter 54 may have three channels and sequentially processes the two inputs from each of the differential amplifiers 53x, 53y, and 53z by switching the inputs.

The computer 10 transmits the inputs ΔHx, ΔHy, and ΔHz from the A/D converter 54 to the locus extraction processing means 11. The locus extraction processing means 11 carries out the predetermined calculation as previously described to sequentially calculate polar coordinates (r, β, α) from the sequentially input ΔHx, ΔHy, and ΔHz. The locus extraction processing means 11 further sequentially calculates the positional coordinates (x, y, z) of the magnet 1. As a result, the locus of the magnet 1 can be extracted. The locus extraction processing means 11 transmits the extracted locus of the positional coordinates (x, y, z) of the magnet 1 to the character recognition processing means 12.

The inputs ΔHx, ΔHy, and ΔHy from the A/D converter 54 may be stored in a buffer memory (not shown). Further, the locus of the positional coordinates (x, y, z) of the magnet 1 output by the locus extraction processing means 11 may be stored in the buffer memory (not shown).

The character recognition processing means 12 executes a character (or graphics) recognition process on the basis of the extracted locus of the positional coordinates (x, y, z) of the magnet 1. The character recognition process can be executed using a character recognition processing technique intended for information input with, for example, an acceleration input type pen. That is, information obtained by the output unit 5 relates to (three-dimensional) positional information and allows the use of an existing character recognition process. Rather, the position of the fingertip is directly detected, thereby preventing errors from being accumulated. Consequently, the (loci of) characters can be input more precisely than in the prior art as data to be subjected to the character recognition process. Therefore, the character recognition rate of the character recognition process can be improved. The character recognition processing means 12 displays the results of the character recognition process on the display device 13 and stores them in a memory (not shown).

Figure 5:
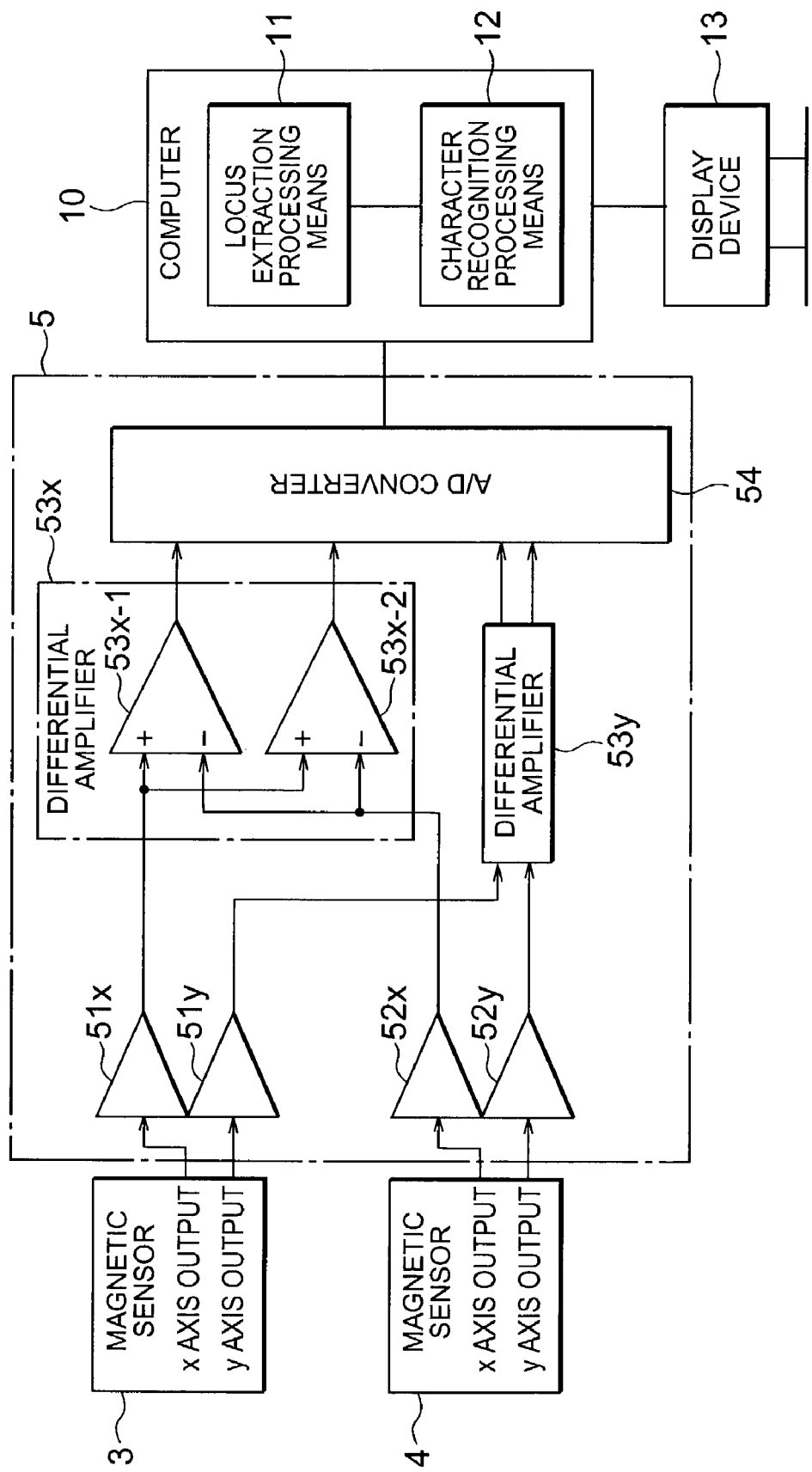
FIG. 5 is a diagram showing a configuration of another input device.

FIGS. 4 and 5 show a configuration of another input device according to the present invention. This input device is worn by a user on both hands to detect two-dimensional positions. In particular, FIG. 4 shows how the input device is worn by the user, and FIG. 5 shows the configuration of the input device of the present invention.

In this example, as shown in FIG. 4, the first magnetic sensor 3 and the second magnetic sensor 4 are worn on the hand (in this example, the left hand) different from the one on which the magnet 1 is worn. The output unit 5 (not shown) is attached to the support 9 on the back surface of the support 8 as in the case with FIGS. 1A and 1B.

This example does not provide any convenient function of allowing characters to be input with one hand, but enables the limitation of the space in which characters are drawn. That is, the palm of the (left) hand on which the first magnetic sensor 3 and the second magnetic sensor 4 are worn can be used as a virtual writing surface as shown in FIG. 4. For example, by tracing the palm with the fingertip with the magnet 1 worn thereon, a visually handicapped person can reliably input characters while recognizing them on the basis of his or her sense of touch (this also applies to people with normal, healthy bodies). Thus, the locus of the positional coordinates (x, y, z) of the magnet 1 may be assumed to be drawn in a two-dimensional space (plane) extending along the palm. In most cases, a slight twist in the plane is negligible.

Although the space in which characters are drawn is limited, the input of characters is not affected even if the locus of the magnet 1 protrudes out from the palm, compared to a physical writing surface. Further, this input device can limit the space in which characters are drawn to a two-dimensional space without the help of any other devices.

As a result, in this example, the first magnetic sensor 3 and the second magnetic sensor 4 are each composed of a biaxial Hall element. The first magnetic sensor 3, composed of a biaxial Hall element, provides the signal outputs Hx and Hy for the axes x and y. The second magnetic sensor 4, composed of a biaxial Hall element, provides the signal outputs Hx' and Hy' for the axes x and y. Accordingly, the configuration of the circuit can be simplified as shown in FIG. 5. That is, comparison of FIG. 5 with FIG. 2 indicates that the output unit 5 in this example includes the first-stage amplifiers 51x, 51y, 52x, and 52y but not the first-stage amplifiers 51z and 52z. Further, the output unit 5 in this example includes the differential amplifiers 53x and 53y but not the differential amplifier 53z. This reduces the number of channels for the A/D converter 54 to four (or two). The A/D converter 54 inputs, to the computer 10, the digital signals corresponding to the differences ΔHx and ΔHy between the detection outputs Hx and Hy from the first magnetic sensor 3 and the detection outputs Hx' and Hy' from the second magnetic sensor 4.

Figure 6:
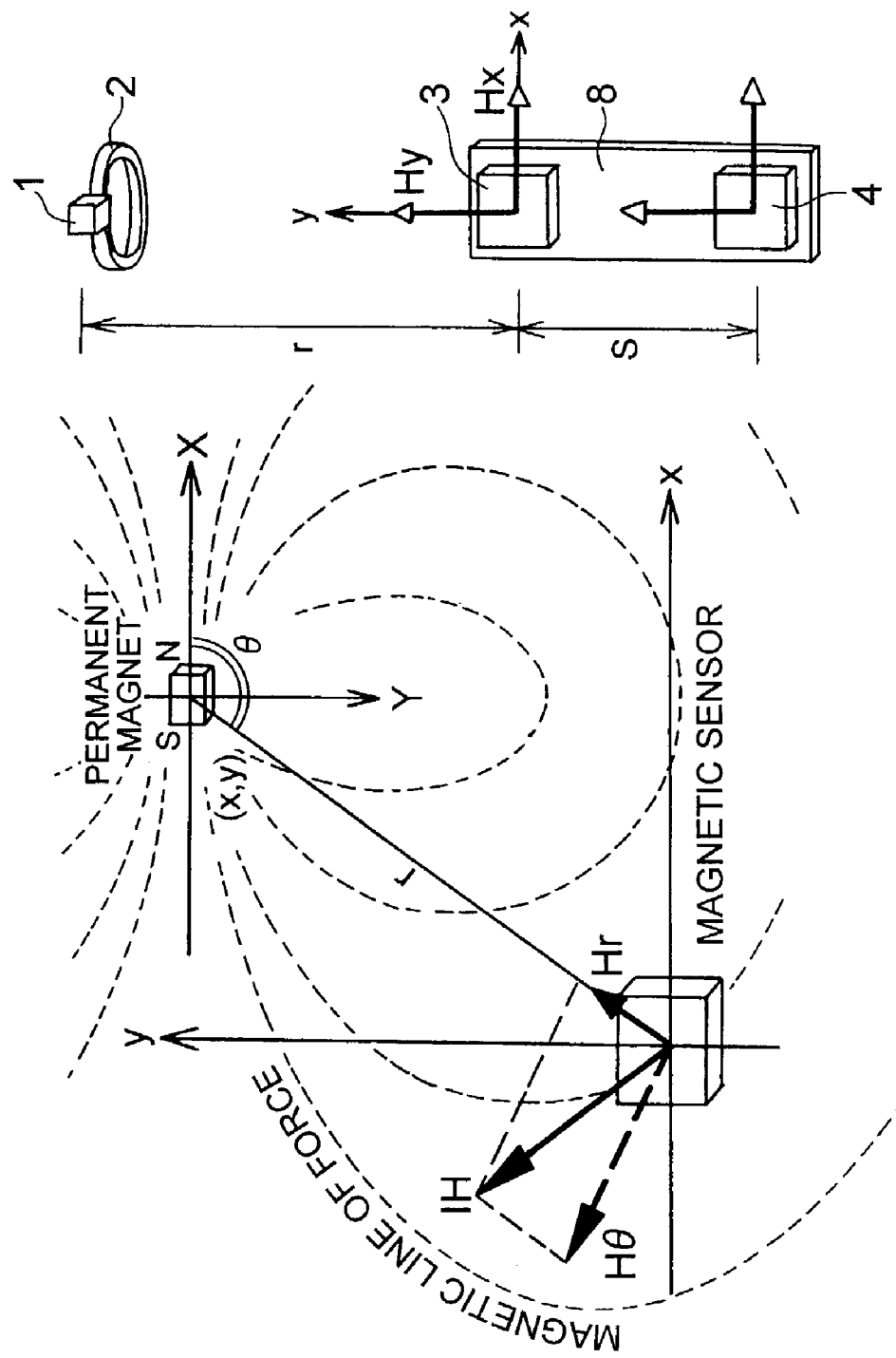
FIG. 6 is a view illustrating the input device shown in FIGS. 4 and 5.

FIG. 6 illustrates the input device in FIGS. 4 and 5 and shows the principle of detection of two-dimensional positions carried out by this input device.

In FIG. 6, the relationship between the position (x, y) of the magnet 1 with a magnetic moment m and the vector H=(Hx, Hy, Hz) of a magnetic field measured by the first magnetic sensor 3, located at the origin, is determined. When the magnetic permeability is defined as μ, the component Hr of the magnetic field travelling from the magnet 1 to the first magnetic sensor 3 and a component Hθ perpendicular to the component Hr are expressed by:

$Hr = (2K \cos \theta)/r^3$, and $H\theta = (K \sin \theta)/r^3$ where $r = (x^2+y^2)^{1/2}$, $-\cos \theta = x/r$, $\sin \theta = y/r$, and $K = m/4\pi\mu$ and where r denotes the distance between the magnet 1 and the first magnetic sensor 3, θ denotes the direction of the magnet 1 relative to the x axis of the first magnetic sensor 3, r and θ are both expressed by positional coordinates, and K is a constant.

If the components Hr and Hθ of the magnetic field are synthesized together and the synthesized component is then redistributed to the x, y, and z axes, the vector of the magnetic field at the origin (the position of the first magnetic sensor 3) is expressed by:

$Hx = Hr \cos \theta - H\theta \sin \theta = K/r^3 (2 \cos^2 \theta - \sin^2 \theta)$, $Hy = -Hr \sin \theta - H\theta \cos \theta = -K/r^3 (3 \cos \theta \sin \theta)$.

If the position of the magnet 1 is determined (assumed) from the vector H=(Hx, Hy) of the magnetic field measured by the first magnetic sensor 3, the above equations may be solved reversely.

$\theta = \cos^{-1}(A)$, $r = ((K^2/(Hx^2+Hy^2))/(3 \cos^2 \theta + 1))^{1/6}$, and $A = (((2Hy^2+3Hx^2)+Hx(9Hx^2+8Hy^2)^{1/2})/(6(Hx^2+Hy^2)))^{1/2}$.

On the basis of the thus determined coordinates (r, θ), the position of the magnet 1 can be calculated as follows:

$$x = r \cos \theta, \text{ and}$$

$$y = r \sin \theta.$$

That is, the positional coordinates (x, y) of the magnet 1 can be expressed by the vector H=(Hx, Hy) of the magnetic field measured by the first magnetic sensor 3.

Figure 7:
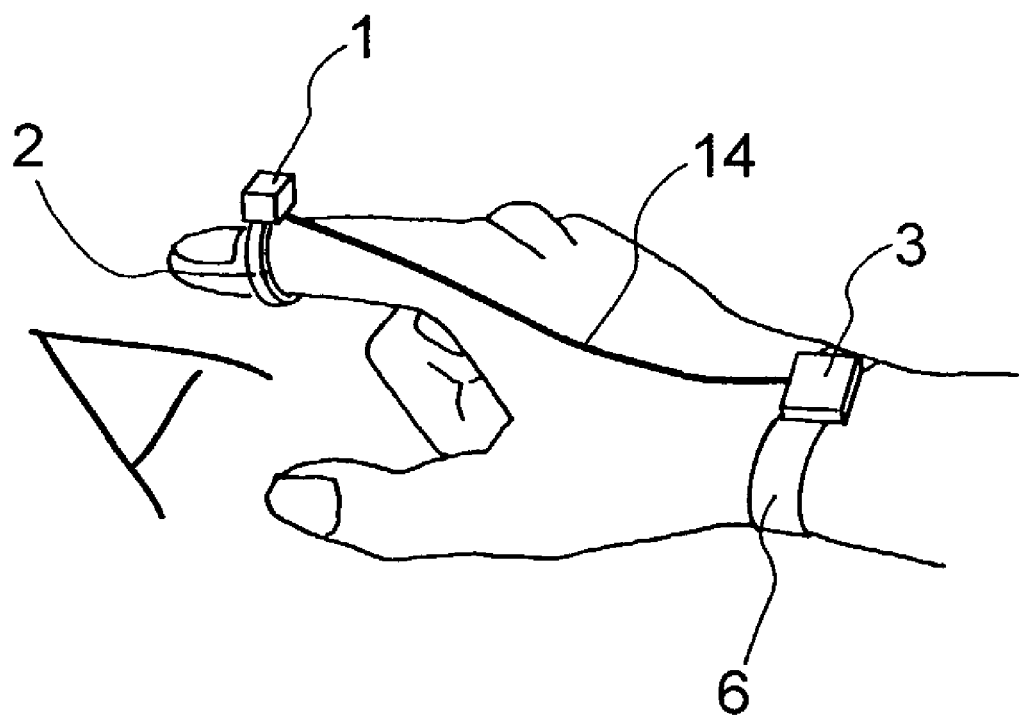
FIG. 7 is a view showing a configuration of yet another input device.
Figure 8:
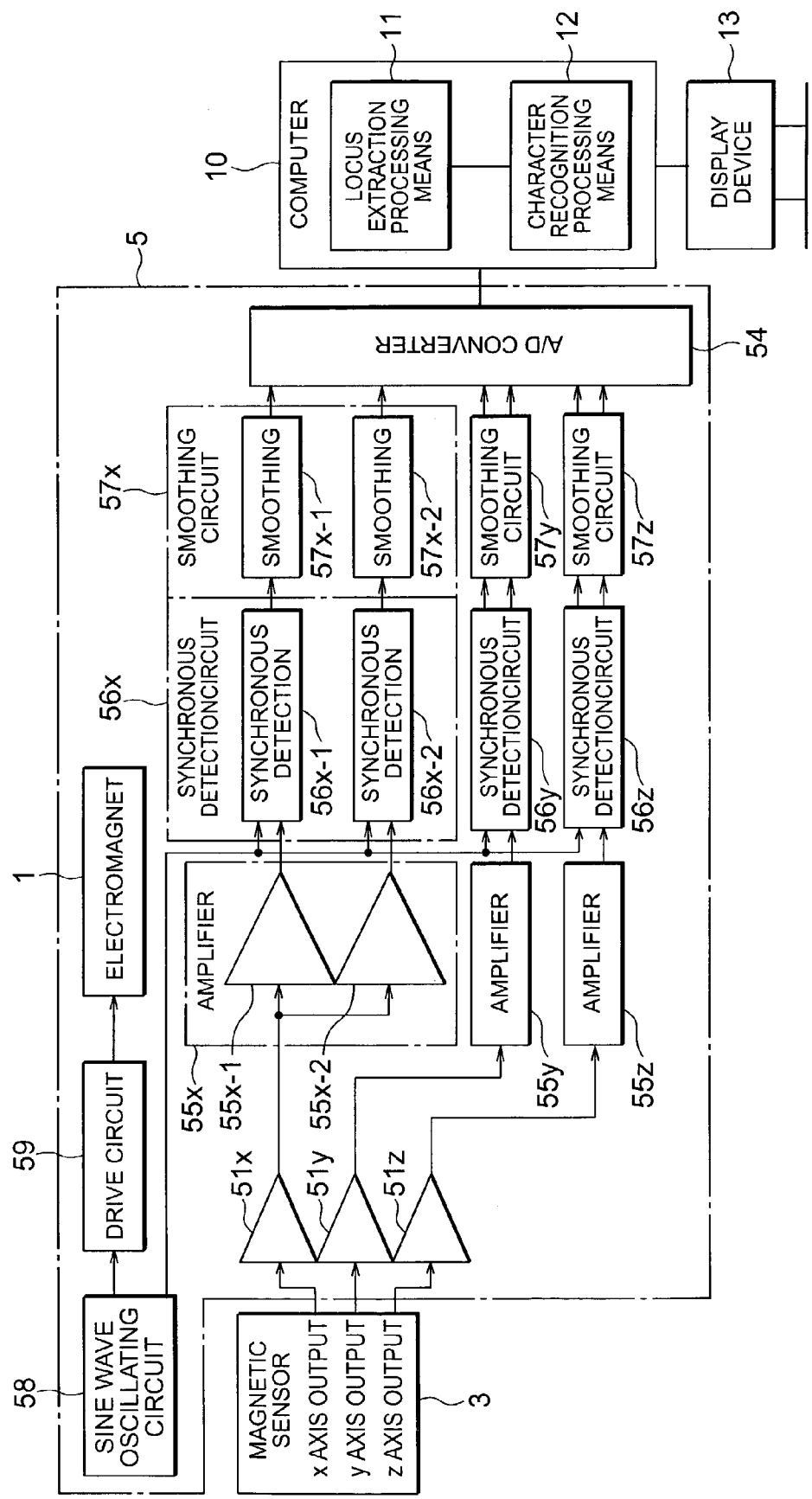
FIG. 8 is a diagram showing a configuration of still another input device.

FIGS. 7 and 8 show a configuration of another input device according to the present invention. This input device is worn by a user on one hand to detect three-dimensional positions. In particular, FIG. 7 shows how the input device is worn by the user, and FIG. 8 shows the configuration of the input device of the present invention.

For the input device in this example, the (first) magnetic sensor 3 for detection is worn on the wrist on which the magnet 1 is worn, with the second magnetic sensor 4 for geomagnetism compensation omitted, as shown in FIG. 7. Then, since the second magnetic sensor 4 is omitted, the output unit 5 supplies alternating current signals of a predetermined frequency to the magnet 1 and the magnetic sensor 3 via a shielding wire 14, and detects output signals from the magnetic sensor 3 on the basis of synchronous detection. Accordingly, the magnet 1 is not composed of a permanent magnet but of an electromagnet. The magnetic sensor 3 is composed of a triaxial (multiaxial) Hall element. Thus, the principle of detection of the position of the magnet 1 is similar to that in the example shown in FIGS. 1A, 1B and 2. Further, the magnet 1 and the magnetic sensor 3 are connected together by the shielding wire 14. Although not shown, the output unit 5 is attached to the support 9 on the back surface of the support 8 as in the case with FIGS. 1A and 1B.

In this example, the presence of the shielding wire 14 makes wearing of the device slightly troublesome. However, this device is more practical because the synchronous detection serves to substantially eliminate the effects of the geomagnetism. Further, this device thus requires an alternating current circuit (see FIG. 8), but eliminates the needs for the magnetic sensor 4 and supports 8 and 9. Consequently, the configuration can be drastically simplified (e.g. a combination of a ring and a bracelet).

In FIG. 8, the output unit 5 synchronously detects and outputs output signals from the first magnetic sensor 3. To accomplish this, the output unit 5 comprises the first-stage amplifiers 51 (51x, 51y, and 51z), amplifiers 55 (55x, 55y, and 55z), synchronous detection circuits 56 (56x, 56y, and 56z), smoothing circuits 57 (57x, 57y, and 57z), and the multichannel analog/digital converter (A/D converter) 54.

The amplifier 55x further amplifies and outputs the output (Hx) provided by the first-stage amplifier 51x by amplifying a detection signal about 230 times, as in the case with FIG. 2. The amplifier 55x is composed of an amplifier 55x-1 having a larger amplification factor of 20 and an amplifier 55x-2 having a smaller amplification factor of 2, as in the case with FIG. 2. Although not shown, this also applies to the amplifiers 55y and 55z. As previously described, the number of amplifiers 55x (stages) is not limited to two. An output from the amplifier 55x-1 is synchronously detected by the corresponding synchronous detection circuit 56x-1. To accomplish this, a sine wave output by a sine wave oscillating circuit 58 is input to the synchronous detection circuit 56x-1. This sine wave is the same as that applied to an electromagnet as the magnet 1. That is, the sine wave output by the sine wave oscillating circuit 58 is applied to the electromagnet as the magnet 1 via a drive circuit 59. Consequently, signals free from the effects of the geomagnetism can be detected on the basis of the well-known synchronous detection. An output from the synchronous detection circuit 56x-1 is smoothed by the smoothing circuit 57x-1 and then input to the A/D converter 54. Also for the amplifier 55x-2, a signal is synchronously detected by the synchronous detection circuit 56x-2 and then smoothed by the smoothing circuit 57x-2. Furthermore, the amplifiers 55y and 55z are similarly provided with the synchronous detection circuits 56y and 56z and the smoothing circuits 57y and 57z. Thus, the A/D converter 54 sequentially converts (analog) signals input by the amplifiers 55x, 55y, and 55z into digital signals, and inputs, to the computer 10, the digital signals corresponding to Δ'Hx, Δ'Hy, and Δ'Hz which are obtained by eliminating the effects of the geomagnetism from the detection outputs Hx, Hy, and Hz from the magnetic sensor 3.

Figure 9:
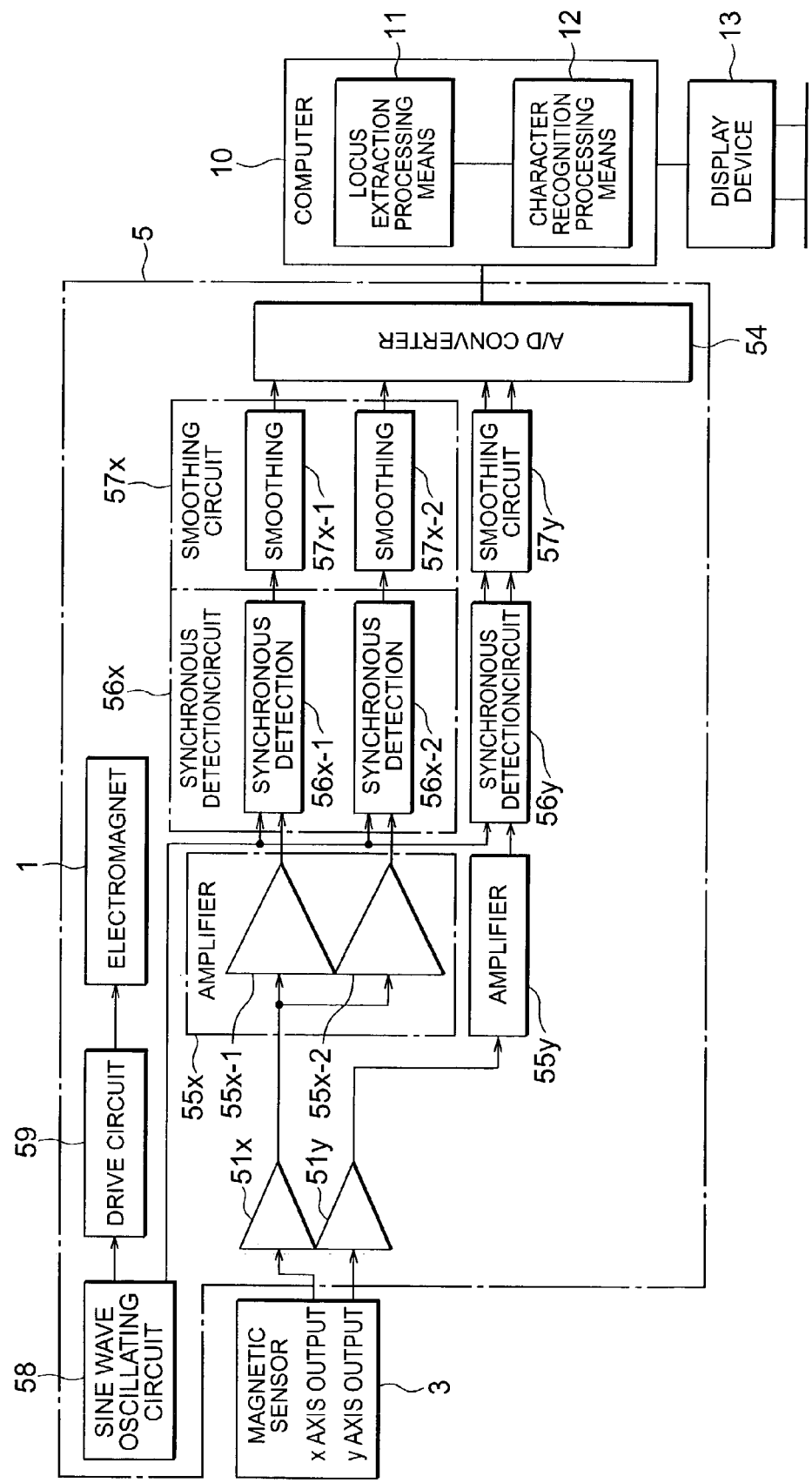
FIG. 9 is a diagram showing a configuration of still another input device.

FIG. 9 shows a configuration of yet another input device according to the present invention. This input device is worn by a user on one hand to detect two-dimensional positions. FIG. 9 corresponds to FIG. 8.

Comparison of FIG. 9 with FIG. 8 indicates that the input device in this example corresponds to the input device in FIGS. 7 and 8, which includes the magnetic sensor 3 composed of biaxial Hall element. Accordingly, the principle of detection of the position of the magnet 1 is similar to that in the example shown in FIGS. 4 and 5. That is, in this example, the input device is worn on one hand, but characters are drawn and input using the palm of the other hand as in the case with FIG. 4. As a result, the magnetic sensor 3 may be a biaxial Hall element.

In FIG. 9, the output unit 5 comprises the first-stage amplifiers 51 (51x and 51y), the amplifiers 55 (55x and 55y), the synchronous detection circuits 56 (56x and 56y), the smoothing circuits 57 (57x and 57y), and the multichannel analog/digital converter (A/D converter) 54. That is, the output unit 5 corresponds to the circuit in FIG. 8, from which a part of the circuit corresponding to the output for the z axis of the magnetic sensor 3 is omitted. Accordingly, signals amplified by the first-stage amplifiers 51x and 51y and the amplifiers 55x and 55y are synchronously detected by the synchronous detection circuits 56x and 56y, respectively, and then smoothed by the smoothing circuits 57x and 57y, respectively. The smoothed signals are then sequentially subjected to A/D conversion by the A/D converter 54. Finally, the digital signals obtained are input to the computer 10, the signals corresponding to the Δ'Hx and Δ'Hy, obtained by eliminating the effects of the geomagnetism from the detection outputs Hx and Hy from the magnetic sensor 3.

In the example shown in FIG. 9, it is assumed that the other palm is also used. Accordingly, the device may be worn on both hands. That is, if the magnet 1 is worn on either the right or left hand, the magnetic sensor 3 may not be worn on the same wrist on which the magnet 1 is worn as in FIG. 7 but on the wrist of the other hand.

Furthermore, in this case, the shielding wire 14 is provided to connect the right and left hands together, thereby bothering the user. Thus, alternating current signals from the magnetic sensor 3 are transmitted to the magnet 1 by radio. This eliminates the need for the shielding wire 14, thereby preventing the user from being bothered by the connection. In this case, two separate power supplies must be provided. That is, the power supply for the magnet 1 is worn, for example, on the right hand (the position of the magnetic sensor 3 in FIG. 7) and connected to the magnet 1 using a shielding wire. On the other hand, the power supply for the magnetic sensor 3 is worn on the left hand.

As described above, the input device according to the present invention can detect the locus of movement of the position of the magnet on the fingertip relative to the (first) magnetic sensor on the wrist, as changes in electric signal. The input device can then input the detected locus to the computer as character information. Further, at this time, the (second) magnetic sensor or synchronous detection can be used to eliminate the effects of the geomagnetism on the (first) magnetic sensor, thereby substantially precisely detecting the locus of the magnet on the fingertip. Thus, compared to the various conventional input devices, even visually handicapped people and others can easily input characters. Further, since the device can be worn on the fingertip and the wrist, the user can easily wear it and carry it anywhere. Therefore, even visually handicapped people and others can use the input device according to the present invention in a mobile environment and can thus operate a computer anywhere.

What is claimed is:

1. An input device comprising:
    a permanent magnet to be worn by a user on one fingertip of either a right hand or a left hand;
    a first magnetic sensor to be worn by the user on a wrist of either the right hand or the left hand to detect a magnetic field generated by the permanent magnet at a position of the first magnetic sensor, and a magnetic field generated by geomagnetism;
    a second magnetic sensor to be worn by the user on the same wrist on which the first magnetic sensor is worn and always at a position that is farther from the permanent magnet than the first magnetic sensor, to detect the magnetic field generated by the permanent magnet at a position of the second magnetic sensor and the magnetic field generated by the geomagnetism; and
    an output unit to output a difference between an output signal from the first magnetic sensor and an output signal from the second magnetic sensor, so that the magnetic field generated by the geomagnetism is eliminated.

2. An input device according to claim 1, wherein each of the first and second magnetic sensors comprise a multiaxial Hall element, a multiaxial magnetoresistive element, or a multiaxial magnetic impedance element.

3. An input device according to claim 1, wherein the first and second magnetic sensors are to be worn on the same hand on which the permanent magnet is worn, and each of the first and second magnetic sensors comprise a triaxial Hall element, a triaxial magnetoresistive element, or a triaxial magnetic impedance element.

4. An input device according to claim 1, wherein the first and second magnetic sensors are to be worn on the hand different from the hand on which the permanent magnet is worn, and each of the first and second magnetic sensors comprise a biaxial Hall element, a biaxial magnetoresistive element, or a biaxial magnetic impedance element.

5. An input device according to claim 1, wherein the output unit further comprises:
    a plurality of amplifiers corresponding, respectively, to outputs of the first magnetic sensor to amplify the output corresponding thereto;
    a plurality of amplifiers corresponding, respectively, to outputs of the second magnetic sensor to amplify the output corresponding thereto, each of the outputs of the second magnetic sensor corresponding, respectively, to outputs of the first magnetic sensor; and
    a plurality of differential amplifiers to amplify a difference between the output of the first magnetic sensor and the output of the second magnetic sensor corresponding to the output of the first magnetic sensor.

6. An input device according to claim 5, wherein each of the plurality of differential amplifiers further comprises a plurality of differential amplifiers, each having a different amplification factor.

7. An input device according to claim 1, wherein the second magnetic sensor has the same structure as the first magnetic sensor.

8. An input device according to claim 1, further comprising:
    a first support to be worn by the user, the support extending in the same direction as the wrist,
    wherein the first and second magnetic sensors are mounted on the first support.

9. An input device according to claim 8, further comprising:
    a second support to be worn by the user,
    wherein the output unit is mounted on the second support.

10. An input device according to claim 9, further comprising:
    a wrist band to fix the first and second supports on the wrist.

11. An input device according to claim 1, wherein the permanent magnet is fixed to a ring to be worn on a fingertip, the ring being made of a material that is not detected by the first and second magnetic sensors.

12. An input device according to claim 11, wherein orientation of S and N poles of the permanent magnet is aligned with a plane created by the ring.

13. An input device comprising:
    electromagnet to be worn by a user on one fingertip of either a right hand or a left hand;
    a magnetic sensor connected to the electromagnet and to be worn by the user on a wrist of either the right hand or the left hand to detect a magnetic field generated by the electromagnet at a position of the magnetic sensor and a magnetic field generated by geomagnetism;
    a shielding wire to connect the electromagnet and the magnetic sensor; and
    an output unit to supply an alternating current signal to the electromagnet and the magnetic sensor via the shielding wire, and to detect an output signal from the magnetic sensor on the basis of synchronous detection, so that the magnetic field generated by the geomagnetism is eliminated from the output signal.

14. An input device according to claim 13, wherein the magnetic sensor comprises a multiaxial Hall element, a multiaxial magnetoresistive element, or a multiaxial magnetic impedance element.

15. An input device according to claim 13, wherein the output unit further comprises:
    a plurality of amplifiers corresponding to each of outputs of the magnetic sensor and to amplify the output corresponding thereto, each of the outputs of the amplifier corresponding to each of the outputs of the magnetic sensor; and
    a plurality of synchronous detection circuits to detect signals by synchronous detection on a basis of each of the outputs of the amplifier and the alternating current signal, the signals being free from the magnetic field generated by the geomagnetism.

16. An input device according to claim 13, further comprising a wrist band to fix the magnetic sensor on the wrist.

17. An input device according to claim 13, wherein the electromagnet is fixed to a ring to be worn on a fingertip, the ring being made of a material that is not detected by the magnetic sensor.

18. An input device according to claim 17, wherein orientation of S and N poles of the electromagnet is aligned with a plane created by the ring.

* * * * *

UNITED STATES PATENT AND TRADEMARK OFFICE
CERTIFICATE OF CORRECTION

| | | |
|---|---|---|
| PATENT NO. | : 7,038,658 B2 | Page 1 of 1 |
| APPLICATION NO. | : 10/385476 | |
| DATED | : May 2, 2006 | |
| INVENTOR(S) | : Hiroaki Seki et al. | |

It is certified that error appears in the above-identified patent and that said Letters Patent is hereby corrected as shown below:

Column 14, line 36, insert --an-- before "electromagnet"

Signed and Sealed this

Tenth Day of April, 2007

JON W. DUDAS
*Director of the United States Patent and Trademark Office*